United States Patent [19]

Robbins

[11] 3,962,171

[45] June 8, 1976

[54] COMPOSITION FOR PROTECTING SURFACES

[75] Inventor: James D. Robbins, Ada, Mich.

[73] Assignee: McGarry & Waters, Grand Rapids, Mich.

[22] Filed: Feb. 19, 1975

[21] Appl. No.: 550,968

Related U.S. Application Data

[63] Continuation-in-part of Ser. No. 337,667, March 2, 1973, abandoned.

[52] U.S. Cl. .......................... 260/33.8 F; 260/34.2; 428/461
[51] Int. Cl.² ...................... C08K 5/02; B32B 15/08
[58] Field of Search ....................... 260/33.8 F, 34.2

[56] References Cited
UNITED STATES PATENTS

| | | | |
|---|---|---|---|
| 2,393,967 | 2/1946 | Brubaker | 260/92.1 |
| 2,559,752 | 7/1951 | Berry | 260/29.6 |
| 3,260,693 | 7/1966 | Stand | 260/33.4 F |

*Primary Examiner*—Donald E. Czaja
*Assistant Examiner*—H. H. Fletcher
*Attorney, Agent, or Firm*—McGarry & Waters

[57] ABSTRACT

A protective coating composition for application to decorative surfaces and the like, the coating composition comprising a solution of a polymerized haloethylene and an organic solvent therefor, the solution being finely dispersed in a diluent in such proportions so that the solution is evenly and thinly spread onto surfaces when sprayed thereon and in such proportions insufficient to cause settling of the polymer solution in a relatively short period of time following gentle agitation. The diluent is volatile for rapid evaporation and comprises, for example, a polyhalogenated hydrocarbon having one to four carbon atoms as, for example, trichloroethane. The coating composition can be mixed with an aerosol and sprayed from an aerosol container onto the surface so that the composition visibly covers the surface to be protected. The composition is then dried to evaporate the diluent and the solvent for the polymer, leaving a white dust-like film on the surface. The film is then easily wiped off to leave a thin transparent coating of, for example, less than 2/1000 of an inch on the surface. The composition is applied to all kinds of surfaces such as painted and unpainted metal surfaces, plastic surfaces and wood surfaces. The composition can also be applied to fruits and vegetables having peelable skins and has been found to greatly retard deterioration and spoiling of the fruits and vegetables.

10 Claims, No Drawings

1

COMPOSITION FOR PROTECTING SURFACES

CROSS-REFERENCE TO RELATED APPLICATIONS

This application is a continuation-in-part of my copending patent application, Ser. No. 337,667, filed Mar. 2, 1973, now abandoned.

BACKGROUND OF THE INVENTION

1. Field of the Invention

This invention relates to protective coatings for surfaces. In one of its aspects, the invention relates to a composition for protecting surfaces such as painted and unpainted metal, silverware, plastic surfaces, and the like. In another of its aspects, the invention relates to a composition for preserving fruits and vegetables.

2. State of the Prior Art

Polytetrafluoroethylene (Teflon) is a well-known synthetic plastic composition. For example, such polymers and methods for making the same are disclosed in United States Patents to Brubaker U.S. Pat. No. 2,393,967 and Berry U.S. Pat. No. 2,559,752. Such products in solid form have a great many uses such as in self-lubricating bearings, liner materials for handling corrosive materials, insulators for electrical conductors and many other uses. These materials also find use as adhesively applied liners for cooking ware and the like for ease of cleaning. Such liners, however, are relatively thick opaque coatings which require special processes of application.

An example of such a process and special composition is disclosed in U.S. Pat. No. 3,260,693, issued July 12, 1966, to Stand. The disclosed composition is a polytetrafluoroethylene dispersion in a liquid polar organic compound selected from the group consisting of trichloro-trifluoro-acetone, monochloro-defluoro-acetic acid and dichloro-tetrachloro-acetone, and a diluent of an organic liquid selected from the group consisting of trichloroethylene, methyl ethyl ketone, methyl isobutyl ketone, dimethyl formamide, tetrahydrofuran, carbon tetrachloride and hexachloroethane. The polytetrafluoroethylene particles have a preferable size in the range of 100–500 microns. This solution produces a relatively heavy opaque coating of the polytetrafluoroethylene. Further, the polar organic compounds form strong solvents which make the solution undesirable for painted surfaces.

The noncorrosive properties of Teflon make it suitable for many purposes. However, its relative insolubility makes it difficult to apply in thin even coatings so that the original color and appearance of the surfaces are retained. Thus, when used as a coating, the Teflon layer has heretofore completely covered the surface with a thickness such that the Teflon appears as a film on the surface. Insofar as I am aware, no systems have been developed for application of a transparent protective coating of Teflon by the consumer to surfaces which he desires to protect.

DESCRIPTION OF THE INVENTION

I have now discovered a composition for applying a protective coating of polymers of haloethylene to the surface of objects such as wood, painted and unpainted metal surfaces, plastics, fruits and vegetables and the like. The composition can be applied by the average consumer with a simple aerosol propellent, or with conventional atomizers, or can be applied on a production line basis with conventional spray paint type of equipment. The composition of my invention provides a thin coating of a haloethylene polymer to desired surfaces, the coating providing a thin, even, transparent film of a thickness less than 2/1000 of an inch. The resulting coating is transparent so that the original appearance of the surface remains, yet the surface is smooth so that it is easily cleaned. In addition, the coating protects the surface from corrosive materials. The coating composition is aptly suited for protective coatings on automobile surfaces to inhibit corrosion as well as on silverware, wood surfaces and plastic surfaces. Further, the compositions can be applied to the skins of fruits and vegetables and the coating markedly inhibits deterioration of the fruits and vegetables.

Briefly, the composition of the invention comprises a solution of a polymerized haloethylene in an organic solvent therefor, the solution being finely and evenly dispersed in a diluent for the polymer solution. The composition is desirably mixed with an aerosol and sprayed onto the surfaces to be protected. The diluent is volatile and present in sufficient amounts to evenly and thinly spread the composition onto the surfaces during the spraying operation and is present in amounts insufficient to cause settling of the polymer solution in a relatively short period of time following agitation.

The composition thus thinly sprayed onto a surface is dried to leave a white dusty coating on the surface. This coating is wiped clean with a rag to leave an even protective transparent coating of the polymerized haloethylene on the surface. The thickness of the haloethylene coating desirably is less than 2/1000 of an inch and can be as low as 1/10,000 of an inch. In a preferred form of the invention, the polymer solution leaves extremely fine particles of the polymer on the surface. The polymer particles lodge in the cracks and crevices of the surface to leave a very smooth finish on the protective surface. Because the noncorrosive polymer is in the cracks and crevices on the surface, dirt and corrosive materials cannot get into these cracks and crevices. Thus, the dirt is easily cleaned from the surfaces and the surfaces are protected from corrosive materials.

The polymerized haloethylene used in the invention is desirably a polymer of tetrafluoroethylene and can be produced in accordance with methods described in said U.S. Pat. Nos. 2,393,967 and 2,559,752. Desirably, the polymer is a low molecular weight polymer, spheroidal in shape, and having a diameter less than 30 microns, and preferably 0.1 to 0.2 microns, before dissolution into the solvent.

The organic solvent used to form a solution with the polymerized haloethylene is a material which forms a true solution with the haloethylene. Such solvents include fluorinated hydrocarbons. A preferred fluorinated hydrocarbon is trichloro-trifluoro-ethane, known commercially as Freon 113.

The amount of the haloethylene polymer in the solution can vary over a wide range. Generally, from 10 to 30% by weight of the haloethylene polymer is dissolved in the solvent, with about a 20% by weight solution being preferable.

The diluent used to evenly disperse the haloethylene polymer solution can be any organic dispersing agent which produces a fine and even distribution of the polymer solution in the diluent so that a resulting coating of less than 2/1000 of an inch can be achieved when the composition is sprayed onto a surface. A preferred group of such diluents is halogenated hydrocarbons having 1 to 4 carbon atoms and having a boiling point in the range of 25°–100°C. Examples of such hydrocarbons are:

carbon tetrachloride
trichloromethane
1, 1, 1-trichloroethane
1, 1-dichloroethane
1, 1-dichloroethylene
difluoro-dichloroethane
1, 1-dibromoethane
1, 1, 1, 2 tetrabromoethane
1, 1, 1, 2 tetrachloroethane
1, 1, 1, 2 tetrachloro-2, 2-difluoroethane
1, 1-dichloropropane
2, 2-dichloropropane
2, 2-difluoropropane
1-chlorobutane
2-chlorobutane
trichloroethylene
perchloroethylene The preferred diluent is 111-trichloroethane.

The amount of diluent with respect to the amount of polymerized haloethylene solvent can vary over a wide range. Generally, the amount of diluent will depend on the particular qualities of the diluent. Sufficient diluent must be used in order to evenly spread the polymerized haloethylene on the surfaces such that the resulting surface coating is transparent and generally less than 2/1000 of an inch. On the other hand, the diluent must be used in amounts which will suspend the polymer evenly without settling after mild agitation. Thus, the suspension or dispersion of the polymer solution in the diluent must be fairly stable with a slight amount of agitation. Generally, the amount of diluent will vary from 50 parts to 95 parts by weight of the diluent to 50 to 5 parts by weight of the polymer solution. Desirably, 10 to 25 weight parts of the polymer solution are used with 90 to 75 parts of the diluent.

Any suitable propellants can be mixed with the coating composition for spraying onto the surfaces. Examples of such aerosols are Freon 11 and Freon 12.

If desirable, an effective amount of an anticoagulant or dispersing compound can be added to the composition to increase the amount of diluent used.

The invention will now be illustrated with the following examples.

EXAMPLE 1

About 20 parts by weight of a granular tetrafluoroethylene polymer having a diameter of from 0.1 to 0.2 microns were mixed with about 80 parts by weight of trichloro-trifluoro-ethane (Freon 113) until a liquid of a viscosity of No. 5 weight oil was produced. The mixing is carried out by centrifuging and mixing at a centrifuge speed of 500 rpm. A translucent opalescent whitish liquid solution is produced by the mixing.

The solution thus produced was brushed onto an acrylic paint finish on metal. The solution dried for ten minutes. The coating was uneven in thickness and produced a streaked appearance to the eye. Further, the coating left a clouded film on the surface resulting from the opalescent coloring of the solution. The thickness of the coating was measured and found to be in excess of 0.005 inches.

The coated surface was then subjected to temperatures ranging from 50° to 80°F over a 24-hour period. The coating curled, cracked, and peeled off in chips.

EXAMPLE 2

The solution produced in accordance with Example 1 was applied to an acrylic painted metal surface with a soft cloth applicator. The results of this test were essentially the same as Example 1. An uneven opalescent colored coating with a streaked appearance was produced on the surface, the coating having a thickness in excess of 0.005 inches. The coating curled and cracked, peeling off in chips after the 24-hour test in a temperature range of 50° to 80°F.

EXAMPLE 3

The solution produced in accordance with Example 1 was mixed on an equal basis with Freon 12 which served as a propellent. The solution was then sprayed onto an acrylic painted test surface with the spray source positioned about 8 inches from the surface. The coating was dried for ten minutes.

The coating produced in accordance with this example was an uneven thickness coating with a streaked appearance having areas of color distortion due to the appearance of the coating. The surface was subjected to temperatures between 50° and 80°F for 24 hours. The coating did not curl but cracks appeared. Rigorous rubbing with a soft cloth for 10 minutes wore down the surface so that the discoloration disappeared. However, the thickness varied and left marks in the appearance of the surface.

The spray nozzle was examined and found to be clogged somewhat after the spray nozzle was allowed to dry.

EXAMPLE 4

The solution produced in accordance with Example 1 was mixed with Freon 11 as a propellent in proportions from 1:9::polymer solution:Freon 11 to 1:1::polymer solution: Freon 11. Each of the solutions was sprayed onto an acrylic coated surface in the same manner as Example 3. Each of the coated surfaces had a nonuniform coating of the polymer which required vigorous rubbing to remove the streaked appearance.

EXAMPLE 5

About 1-weight part of the polymer solution produced in accordance with Example 1 was mixed with 1 part to 9 parts, by weight, of 1,1,1-trichloroethane and agitated vigorously. Each of these mixtures formed an emulsion wherein the Teflon solution was finely dispersed into the 111 trichloroethane. When the proportions of the Teflon solution and trichloroethane were about 1 to 1, the emulsion state remained for approximately 5 minutes before appreciable settling commenced. When the proportions were about 1:9, Teflon solution:trichloroethane, the emulsion remained approximately 70 seconds before appreciable settling commenced.

The mixture containing one part of the Teflon solution and 9 parts of the trichloroethane was mixed with 6 parts by volume of Freon 12 which was used as a propellent. The aerosol mixture was sprayed from 8 inches onto an acrylic finish metal surface and the mixture was agitated every 60 seconds. An evenly covered coating was produced on the surface and the coating was allowed to dry for 10 minutes. After the ten-minute drying time, the coating appeared as a white dust on the surface. The dust was removed by softly wiping with a cheese-cloth. A slight unevenness appeared in the resulting surface. Rubbing vigorously on the surface reduced the coating to an even transparent coating on the surface.

This same aerosol composition was sprayed onto another test surface, this time shaking approximately every ten seconds. Once again a white dust formed on the surface after about 10 minutes. The white dust was wiped off and slight polishing of the surface resulted in a fine even transparent coating. The thickness of the surface measured was about 0.001 inches.

EXAMPLE 6

About 1 weight part of the polymer solution produced in accordance with Example 1 was mixed with about 4 parts of 111 trichloroethane to produce a fine dispersion of the Teflon solution in the trichloroethane. To this dispersion, 5 weight parts of Freon 11 and 5 weight parts of Freon 12 were added. The Freon 12 apparently enhanced the dispersion qualities of the trichloroethane and the emulsion remained stable for 90 seconds before appreciable settling commenced. However, gentle agitation of the mixture restored the dispersion to its original nature.

This solution was then sprayed onto an acrylic painted surface from about 8 inches. The wafting action of the solution during the spraying was sufficient to prevent settling of the dispersion during the spraying operation. After the surface dried for 10 minutes, a white dust formed on the surface which was easily wiped off with cheese-cloth. The surface had a shiny even appearance, indicating an even transparent coating on the acrylic surface. The thickness was measured to be between 0.008 to 0.005 inches.

EXAMPLE 7

A stainless steel sheet such as used for range hoods was used as a test piece. The stainless steel sheet was not polished but had a rough brushed appearance to it.

A piece of the stainless steel sheet was coated with the mixture produced in Example 6 in the same manner as provided in Example 6. After the white dust which formed on the surface was wiped off, and the surface was polished lightly, the sheet had a smooth feel although the coating was transparent.

EXAMPLE 8

Portions of an automobile body have a pitted surface resulting from corrosion were coated with the composition of Example 6 and in the manner described in Example 6. Portions of the surface were left uncoated. Both test pieces were left outside in the open for six months and exposed to temperatures ranging from 100°F to 5° below zero. The areas coated by the composition appeared to show no visible change to the eye. However, the uncoated portions showed substantial growth of rust and pitting.

EXAMPLE 9

The composition of Example 6 was applied to other surfaces including formica, stainless steel, varnished kitchen cupboards, wood furniture pieces, wood paneling, silver service, chrome, and terrazio tile. The coating on each of these surfaces was uniform and transparent and the coating did not appreciably change the surface appearance of any of the surfaces. However, the surfaces were much easier to clean and appear to have a much smoother, even surface.

EXAMPLE 10

A composition produced in accordance with Example 6 was sprayed onto the outside surfaces of an unpeeled orange. The coated orange was left in a household for about 3 weeks in unrefrigerated condition. An orange from the same batch was left out adjacent to the coated orange for an equal length of time. At the end of the three-week period, the coated orange showed no visible change in appearance whereas the uncoated orange was substantially withered. Upon peeling of the coated orange, it was discovered that the orange had not lost its freshness.

EXAMPLE 11

A solution in accordance with Example 6 was prepared except that the particles of granular tetrafluorethylene polymer had an average diameter of 5 microns instead of 0.1 to 0.2 microns. The solution was sprayed onto an acrylic painted surface from about 8 inches. After the surface dried for about 10 minutes, a white dust formed on the surface which was easily wiped off with cheese-cloth. The surface had a shiny, even appearance, indicating an even transparent coating on the acrylic surface.

EXAMPLES 12–15

The same procedure as followed in Example 11 was followed except that the size of the granular tetrafluorethylene polymer was changed. In Example 12 the average diameter of the polymer particles was about 10 microns. In Example 13, the average diameter of the polymer particles was about 20 microns. In Example 14, the average diameter of the polymer particles was about 30 microns. In Example 15, the average diameter of the polymer particles was about 35 microns.

In Examples 12 through 14, the final surface appeared to be substantially the same as the surface produced with Example 11 in that the coating was a thin, even, transparent coating. However, in Example 15, the surface had an opalescent quality and was not transparent.

The above Examples 11–15 show that when the particle size of the tetrafluorethylene polymer is in excess of about 30 microns before dissolution, an opalescent surface results when the final composition is sprayed onto a surface.

The foregoing examples further illustrate that the compositions according to the invention can be applied by the average unskilled person to any surface to produce an even transparent coating on the surface. The coating composition of the invention is easily sprayed from conventional spray equipment without clogging of the spray nozzle. The coated surfaces have a nonstick quality and are far easier to clean than uncoated surface. Because the coating lodges in the cracks and crevices of the surfaces, dirt and corrosive materials are easily removed from the surfaces and corrosion is retarded. Because the coating material itself is noncorrosive, it cannot be worn away by corrosive materials such as salt from the roads, sulfuric acid, and other common ordinary corrosive materials. The surface is thus protected from corrosive materials. Even though the coating may in time wear away, it can be easily replaced by the consumer in a simple operation.

Reasonable variation and modification are possible within the scope of the foregoing disclosure and the appended claims without departing from the spirit of the invention.

The embodiments of the invention in which an exclusive property or privilege is claimed are defined as follows:

1. A protective coating composition for application to decorative and other surfaces, said coating composition comprising:
    50 to 5 parts by weight of a solution of 10 to 30 parts by weight of polytetrafluoroethylene and 90 to 70 parts of a fluorinated hydrocarbon solvent therefor, said polytetrafluoroethylene having a particle size less than about 30 microns before dissolution into said solvent and forming a solution therewith;
    50 to 95 parts by weight of a volatile diluent of a halogenated hydrocarbon having 1 to 4 carbon atoms and a boiling point in the range of 25°–100°C, said polytetrafluoroethylene solution being finely and evenly dispersed in said diluent;
    said diluent being present in sufficient amounts to evenly and thinly spread said composition onto surfaces when sprayed, and in amounts insufficient to cause settling of said polytetrafluoroethylene solution in a relatively short period of time following agitation, said composition, when sprayed onto a surface, forms a transparent coating after drying and buffing.

2. A protective coating composition according to claim 1 wherein said polytetrafluoroethylene is a low molecular weight polymer of tetrafluoroethylene.

3. A protective coating composition according to claim 1 wherein said halogenated hydrocarbon is trichloroethane.

4. A protective coating composition according to claim 3 wherein said trichloroethane is present in about 4 weight parts per weight part of said polytetrafluoroethylene solution.

5. A protective coating composition according to claim 1 and further including an aerosol material in amounts sufficient to propel said dispersion in spray form evenly onto surfaces.

6. A protective coating according to claim 1 wherein said particles have a diameter in the range of 0.1 to 0.2 microns before dissolution into said solvent.

7. A protective coating composition for application of a thin substantially transparent coating to decorative and other, said composition consisting essentially of:
    about 5 to 50 weight parts of (A) a solution of about 10 to 30 parts by weight of (1) polytetrafluoroethylene in 90 to 70 parts by weight of (2) an organic solvent of a volatile fluorinated hydrocarbon, the polytetrafluoroethylene having a particle size of 0.1 to 0.2 microns in diameter before dissolution into said solvent and forming a solution therewith; and
    about 95 to 50 weight parts of (B) a volatile diluent for said polytetrafluoroethylene solution, said diluent being a halogenated hydrocarbon having 1 to 4 carbon atoms and a boiling point in the range of 25°–100°C.

8. A protective coating composition according to claim 7 and further comprising an aerosol material in amounts sufficient to propel said dispersion in spray form evenly onto surfaces.

9. A protective coating composition according to claim 8 wherein about 25 weight parts of the solution (A) is present in the composition and about 75 weight parts of the volatile diluent (B) is present in the composition, and said polytetrafluoroethylene is present in about 5 weight parts in said composition.

10. A protective coating composition according to claim 1 wherein said transparent coating is less than 2/1000 inches thick.

* * * * *